US012682190B2

(12) United States Patent
Pandey et al.

(10) Patent No.: US 12,682,190 B2
(45) Date of Patent: Jul. 14, 2026

(54) OBJECT POSITIONING AND TRACKING BASED ON RFID AND MILLIMETER WAVE SCANNING

(71) Applicant: Hand Held Products, Inc., Charlotte, NC (US)

(72) Inventors: Pankaj Kumar Pandey, Charlotte, NC (US); Gourango Lal Biswas, Charlotte, NC (US); Shashidhar Ramamurthy, Charlotte, NC (US); Kailash Kashyap Godawarthy, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/764,640

(22) Filed: Jul. 5, 2024

(65) Prior Publication Data

US 2025/0028916 A1 Jan. 23, 2025

(30) Foreign Application Priority Data

Jul. 19, 2023 (IN) .............................. 202311048276

(51) Int. Cl.
*G06K 7/10* (2006.01)
*G06K 19/077* (2006.01)

(52) U.S. Cl.
CPC ... *G06K 7/10366* (2013.01); *G06K 19/07773* (2013.01)

(58) Field of Classification Search
CPC ..................... G06K 7/10366; G06K 19/07773
USPC ........................................................ 235/451
See application file for complete search history.

(56) References Cited

U.S. PATENT DOCUMENTS

| | | | | |
|---|---|---|---|---|
| 9,892,438 | B1 * | 2/2018 | Kundu | ............... G06Q 30/0609 |
| 2015/0039458 | A1 | 2/2015 | Reid | |
| 2018/0373909 | A1 | 12/2018 | Nikitin et al. | |
| 2019/0079176 | A1 * | 3/2019 | Weissman | ............. G01S 5/0036 |
| 2019/0156081 | A1 | 5/2019 | Pous et al. | |
| 2021/0117659 | A1 | 4/2021 | Foroozan et al. | |

(Continued)

FOREIGN PATENT DOCUMENTS

WO 2022/108706 A1 5/2022

OTHER PUBLICATIONS

European search report Mailed on Dec. 6, 2024 for EP Application No. 24182428, 16 page(s).

(Continued)

*Primary Examiner* — Ahshik Kim
(74) *Attorney, Agent, or Firm* — ALSTON & BIRD LLP

(57) ABSTRACT

A method and system are directed to identifying, locating, and track locations of assets and actors within a local environment. The system comprises a millimeter wave (mmWave) antenna circuit coupled to a beam steering antenna (BSA). The mmWave antenna circuit comprises an mmWave processing unit (MPU) coupled to an RFID integrated circuit. An RFID reader may be configured to scan and locate RFID tags attached to assets within particular zones/beams of the local environment by communicating with the RFID integrated circuit. The MPU is configured to scan for actors in the particular zones/beams, generate a point cloud to determine actor positions within the point cloud, and communicate point cloud position data to the RFID integrated circuit.

15 Claims, 8 Drawing Sheets

(56)                     References Cited

U.S. PATENT DOCUMENTS

2022/0067689 A1      3/2022  Guack et al.
2023/0252197 A1*     8/2023  Bergqvist .............. G01S 13/865
                                              703/1

OTHER PUBLICATIONS

Extended European Search Report Mailed on Apr. 16, 2025 for EP
Application No. 24182428, 15 page(s).

* cited by examiner

OBJECT POSITIONING AND TRACKING BASED ON RFID AND MILLIMETER WAVE SCANNING

CROSS-REFERENCE TO RELATED APPLICATIONS

This application claims priority pursuant to 35 U.S.C. 119(a) to Indian Application No. 202311048276, filed Jul. 19, 2023, which application is incorporated herein by reference in its entirety.

FIELD OF THE INVENTION

Example embodiments of the present disclosure relate generally to radio frequency identification (RFID) systems, and in particular, to RFID location systems and methods.

BACKGROUND

Radio frequency identification (RFID) tags may be affixed to items whose presence is to be detected and/or monitored. The presence of an RFID tag, and therefore the presence of the item to which the tag is affixed, may be checked and monitored wirelessly by RFID readers. RFID systems are useful in a wide variety of applications. For example, an RFID system may be used to facilitate the identification and tracking of assets that need to be reliably monitored within a particular environment, such as a retail store.

RFID systems may include large numbers of tags and readers spread out across potentially wide areas and it may be desirable to obtain the location of items having attached tags. For example, in a retail store, RFID tags may be affixed to merchandise throughout the retail store. It may be useful to not only monitor the presence of the merchandise but also the locations of the merchandise in the retail store to understand shopper behavior/footfall (e.g., customer after putting a pair of trousers in a shopping cart then also puts a shirt in the shopping cart).

Existing methods and systems have been developed to scan and monitor in-store activities. Applicant has identified technical challenges and difficulties associated with such existing methods and systems.

BRIEF SUMMARY

Various embodiments described herein relate to components, apparatuses, and systems for tracking objects.

In accordance with various embodiments of the present disclosure, an antenna unit is provided. In some embodiments, the antenna unit comprises a coupler coupled to a reader computing entity at an input port of the coupler, a radio frequency (RF) switch coupled to a first output port of the coupler, an radio frequency identification (RFID) integrated circuit (IC) coupled to a second output port of the coupler, wherein the RFID IC is configured to select between a local beam steering antenna and a switch antenna for RFID scanning by switching RF switch based on read instruction signals from the reader computing entity. In some embodiments, the antenna unit further comprises a mmWave processing unit (MPU) coupled to the RFID IC, wherein the MPU is configured to: (i) generate point cloud position data and (ii) transmit the point cloud position data to the RFID IC. In some embodiments, the antenna unit further comprises a mmWave antenna element coupled to the MPU.

In some embodiments, the mmWave antenna element comprises a four-element mmWave radar antenna. In some embodiments, the MPU is coupled to the RFID IC using a serial peripheral interface. In some embodiments, the local beam steering antenna is disposed overhead a location in an indoor environment. In some embodiments, the mmWave antenna element comprises a transmitting antenna, a receiving antenna, a frequency synthesizer, and a mixer.

According to another embodiment, a method is provided. In some embodiments, the method comprises receiving, by a computing device, RFID tag data and point cloud position data from one or more reader computing entities; associating, by the computing device, a location of the given shopper with a shopping cart RFID tag associated with an unassociated shopping cart in proximity to the given shopper based on the RFID tag data and the point cloud position data; determining, by the computing device, a location change of the given shopper has occurred; determining, by the computing device, one or more additional merchandises have been selected by the given shopper; associating, by the computing device, the one or more additional merchandises with the given shopper and the shopping cart RFID tag; determining, by the computing device, one or more previously selected merchandises associated with the given shopper prior to the location change; and generating a shopping behavior data entry comprising an indication of the given shopper selecting the one or more additional merchandises after selection of the one or more previously selected merchandises and the location change.

In some embodiments, the RFID tag data comprises identification of one or more RFID tags detected in one of one or more beam zones. In some embodiments, the point cloud position data comprises identification of objects within coordinates associated with one or more beam zones. In some embodiments, the RFID tag data is generated based on RF signals received from one or more RFID tags in response to RFID read signals transmitted from the one or more reader computing entities. In some embodiments, the point cloud position data is generated by a millimeter wave processing unit (MPU).

In some embodiments, the method further comprises detecting the given shopper based on the point cloud position data and identifying the unassociated shopping cart based on the RFID tag data. In some embodiments, determining the given shopper is associated with a shopping cart further comprises determining a location of the shopping cart based on the RFID tag data and corroborating interaction of the given shopper with the shopping cart based on the point cloud position data. In some embodiments, the location comprises an identification of a beam zone and/or point cloud coordinates. In some embodiments, determining the location change of the given shopper has occurred further comprises determining that a current location of the given shopper is different from the location associated with the given shopper and the shopping cart RFID tag. In some embodiments, the current location of the given shopper comprises a beam zone and/or point cloud coordinates that are different from a beam zone and/or point cloud coordinates of the location associated with the given shopper and the shopping cart RFID tag. In some embodiments, the method further comprises updating the location of the given shopper based on the location change. In some embodiments, determining the one or more additional merchandises have been selected by the given shopper further comprises detecting RFID tags associated with the one or more additional merchandises and determining the one or more additional merchandises are in proximity to the location of the given shopper. In some embodiments, determining the one or more additional merchandises are in proximity to the location of the given shopper further comprises determining one or more of angle, received signal strength indicator, or movement/visibility of one or more RFID tags associated with the one or more additional merchandises based on the RFID tag data and the point cloud position data.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION

Figure 1:
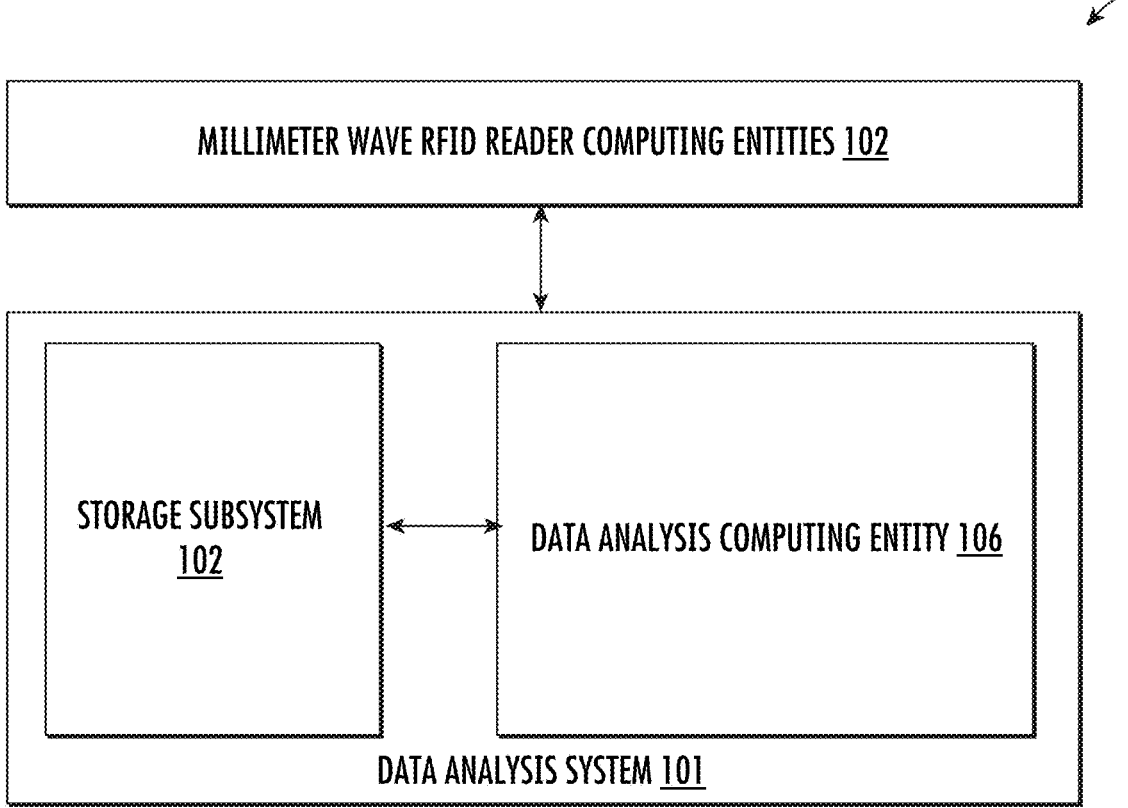
FIG. 1 provides an example overview of an architecture in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc., are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Retailers are often interested in the shopping activities, behaviors, and/or habits of shoppers in retail stores. Understanding shopper behavior is an area of particular interest to retailers since shopper behavior is critical to optimizing marketing strategies including store layout planning. Consumer activity related to shopping can be used to correlate product sales with particular shopping behaviors and/or to improve placements of products, advertisements, and/or other product-related information in a retail store. As such, acquiring information related to shopping activities, behaviors, and/or habits of shoppers in a retail store enables retailers to plan their planogram and also plan their inventory offers for sale days. Real-time location systems employing technologies, such as Bluetooth, ultra-wideband, or WiFi, may be used to identify and track the location of merchandises and/or shoppers within a contained area in real-time. However, setup of infrastructure needed to support such real-time location systems may be time consuming and costly.

According to various embodiments of the present disclosure, a radio frequency identification (RFID) system is combined with a radiolocation system to identify, locate, and track locations of assets and actors within a local environment. As such, information from both systems may be interrelated to determine movement patterns of individual assets as well as the actors interacting with the individual objects. For example, RFID tag data associated with detected merchandises and/or shopping carts (assets) from the RFID system and position data of shoppers (actors) obtained from the radiolocation system may be used together to map and determine where and which path shoppers are taking in a retail store.

In some embodiments, the radiolocation system comprises a millimeter wave (mmWave) antenna circuit. The mmWave antenna circuit may be configured to deploy radar operating in the millimeter-wave band. In some embodiments, the mmWave antenna circuit is coupled to a beam steering antenna (BSA). In some embodiments, the mmWave antenna circuit comprises a four-element mmWave radar antenna. In some embodiments, the mmWave antenna circuit further comprises an mmWave processing unit (MPU) coupled to an RFID integrated circuit. In some embodiments, an RFID reader may be configured to scan and locate RFID tags attached to assets within particular zones/beams of the local environment by communicating with the RFID integrated circuit. In some embodiments, the MPU is configured to scan for actors in the particular zones/beams via the four-element mmWave radar antenna, generate a point cloud to determine actor positions within the point cloud, and communicate point cloud position data to the RFID integrated circuit.

In some embodiments, the RFID reader transmits an identification of the RFID tags and the actor positions to a data analysis system. In some embodiments, the data analysis system may associate the RFID tags to the actor positions. For example, the one or more RFID tags may comprise identification information, such as a serial number or identification number of assets attached with the one or more RFID tags, and the data analysis system may singulate the one or more RFID tags to specific actors based on a combination of RFID tag data determined by the RFID system and actor positions within a point cloud determined by the MPU.

The example methods, systems, and apparatuses disclosed herewith can be used in a retail environment to determine shopper locations associated with shopper traffic and the times at which locations of those shoppers are detected. In addition, paths of travel of different shoppers can be determined. The example methods, systems, and apparatuses may be used to help retailers better understand the amount of shopper traffic and shopper traffic trends in retail stores. For example, by monitoring in-store shopper quantities and traffic, the example methods, systems, and apparatuses can be used to determine when shopper traffic is heaviest and lightest and to determine locations most frequented in a retail store.

FIG. 1 is a schematic diagram of an example architecture 100 for tracking assets, such as shopping carts and merchandise, and actors, such as shoppers, on the assets. The architecture 100 includes a data analysis system 101 configured to receive RFID tag data associated with one or more RFID tags attached to assets and point cloud position data comprising actor positions from mmWave RFID reader computing entities 102, associate the one or more RFID tags to the actor positions, and generate an actor behavior data set (e.g., comprising activity of the actors with respect to the one or more RFID tags). In some embodiments, data analysis system 101 may communicate with at least one of the mmWave RFID reader computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The data analysis system 101 may include a data analysis computing entity 106 and a storage subsystem 108. The data analysis computing entity 106 may be configured to receive RFID tag data associated with one or more RFID tags attached to assets and point cloud position data comprising actor positions from mmWave RFID reader computing entities 102, associate the one or more RFID tags to the actor positions, and generate an actor behavior data set. The storage subsystem 108 may be configured to store input data used by the data analysis computing entity 106 to perform predictive data analysis as well as model definition data used by the data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

Figure 2:
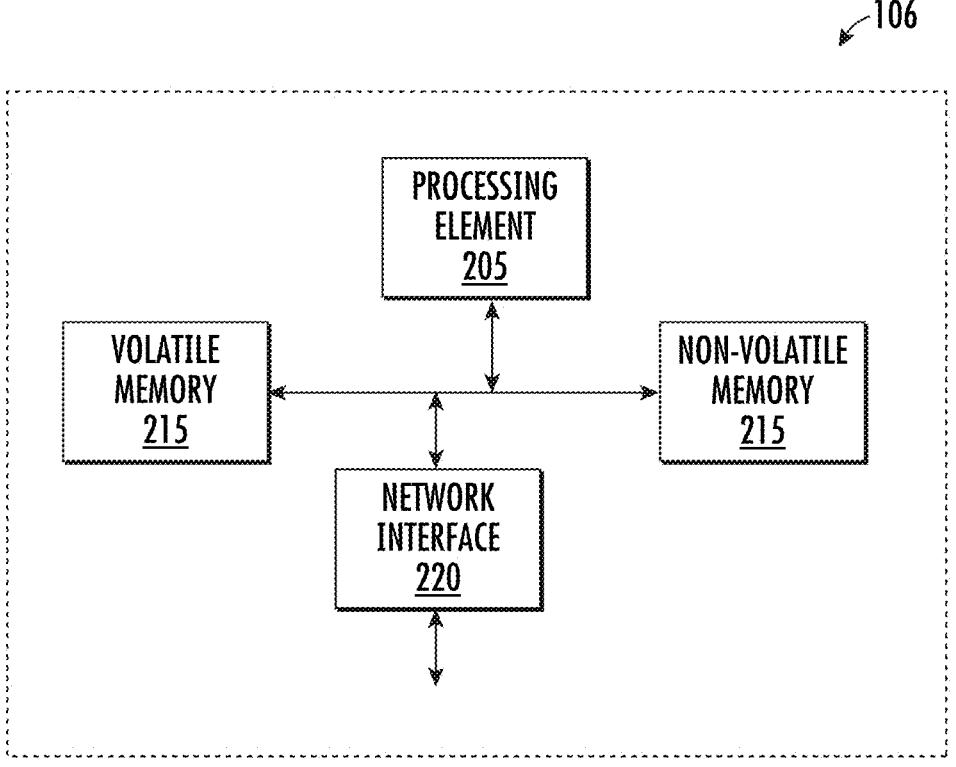
FIG. 2 provides an example data analysis computing entity in accordance with some embodiments of the present disclosure.

FIG. 2 provides a schematic of a data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably.

As shown in FIG. 2, in some embodiments, the data analysis computing entity 106 may include, or be in communication with, one or more processing elements 205 (also referred to as processors, processing circuitry, and/or similar terms used herein interchangeably) that communicate with other elements within the data analysis computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the data analysis computing entity 106 may further include, or be in communication with, non-volatile media (also referred to as non-volatile storage, memory, memory storage, memory circuitry, and/or similar terms used herein interchangeably). In some embodiments, the non-volatile storage or memory may include one or more non-volatile memory 210, including, but not limited to, hard disks, ROM, PROM, EPROM, EEPROM, flash memory, MMC, SD memory cards, SmartMedia cards, CF cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the data analysis computing entity 106 may further include, or be in communication with, volatile media (also referred to as volatile storage, memory, memory storage, memory circuitry and/or similar terms used herein interchangeably). In some embodiments, the volatile storage or memory may also include one or more volatile memory 215, including, but not limited to, random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analysis computing entity 106 with the assistance of the processing element 205 and operating system.

As indicated, in some embodiments, the data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data analysis computing entity 106 may include, or be in communication with, one or more input elements, such as a keyboard input, a mouse input, a touch screen/display input, motion input, movement input, audio input, pointing device input, joystick input, keypad input, and/or the like. The data analysis computing entity 106 may also include, or be in communication with, one or more output elements (not shown), such as audio output, video output, screen/display output, motion output, movement output, and/or the like.

Figure 3:
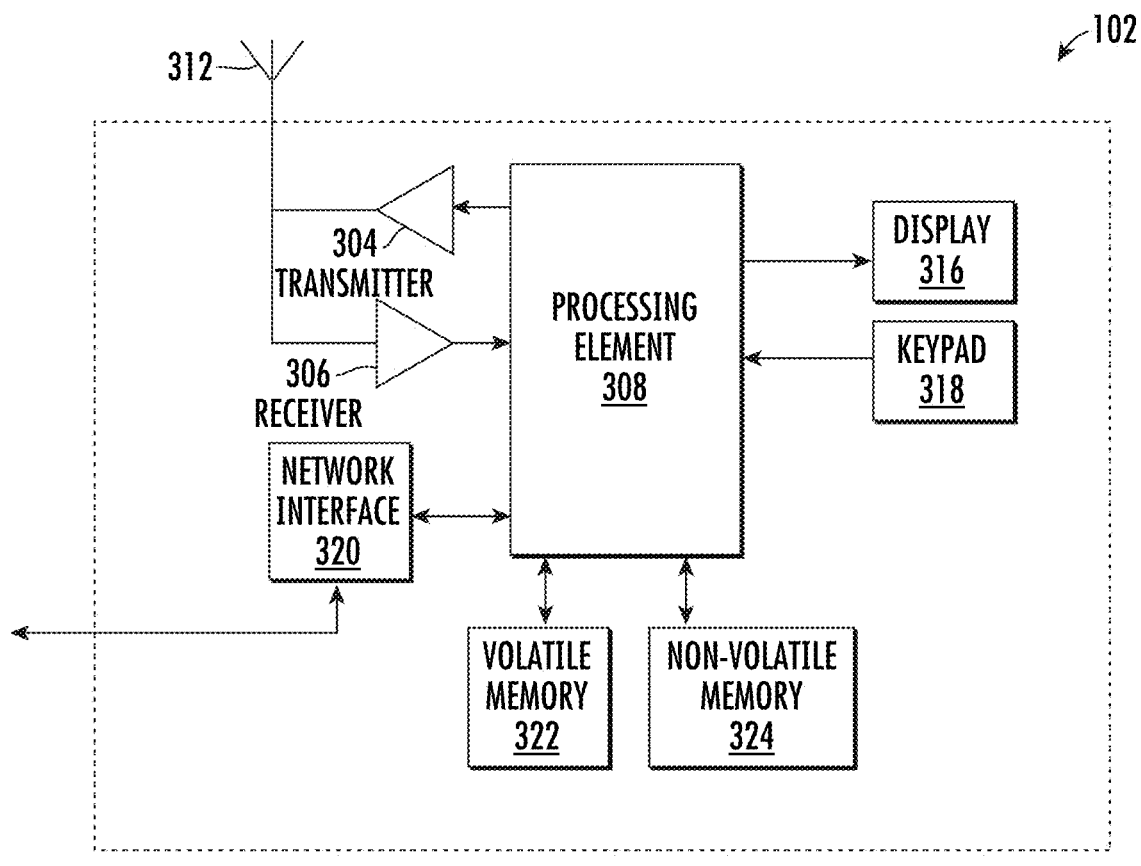
FIG. 3 provides an example millimeter wave radio frequency identification reader computing entity in accordance with some embodiments of the present disclosure.

FIG. 3 provides an illustrative schematic representative of an mmWave RFID reader computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the mmWave RFID reader computing entities 102 can include one or more antenna units 312, one or more transmitters 304 (e.g., radio), one or more receivers 306 (e.g., radio), and a processing element 308 (e.g., CPLDs, microprocessors, multi-core processors, coprocessing entities, ASIPs, microcontrollers, and/or controllers) that provides signals to and receives signals from the one or more transmitters 304 and the one or more receivers 306, correspondingly. In some embodiments, the mmWave RFID reader computing entities 102 the one or more antenna units 312, the one or more transmitters 304, and the one or more receivers 306 may be dedicated to communications with specific entities. For example, a first set of the one or more antenna units 312, the one or more transmitters 304, and the one or more receivers 306 may be dedicated for communications with data analysis computing entity 106, and a second set of the one or more antenna units 312, the one or more transmitters 304, and the one or more receivers 306 may be dedicated for communications with RFID tags and a radiolocation sensor (e.g., mmWave).

The signals provided to and received from the one or more transmitters 304 and the one or more receivers 306, correspondingly, may include signaling information/data in accordance with air interface standards of applicable wireless systems. In this regard, the mmWave RFID reader computing entity 102 may be capable of operating with one or more air interface standards, communication protocols, modulation types, and access types. More particularly, the mmWave RFID reader computing entity 102 may operate in accordance with any of a number of wireless communication standards and protocols, such as those described above with regard to the data analysis computing entity 106. In some embodiments, the mmWave RFID reader computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, RFID, and/or the like. Similarly, the mmWave RFID reader computing entity 102 may operate in accordance with multiple wired communication standards and protocols, such as those described above with regard to the data analysis computing entity 106 via a network interface 320.

Via the aforementioned communication standards and protocols, the mmWave RFID reader computing entity 102 can communicate with various entities, such as data analysis computing entity 106 using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mmWave RFID reader computing entity 102 can also download changes, add-ons, and updates, for instance, to its firmware, software (e.g., including executable instructions, applications, program modules), and operating system.

According to some embodiments, the mmWave RFID reader computing entity 102 may include location determining aspects, devices, modules, functionalities, and/or similar words used herein interchangeably. For example, the mmWave RFID reader computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mmWave RFID reader computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the mmWave RFID reader computing entity 102 to interact with and/or cause display of information/data from the data analysis computing entity 106, as described herein. The user input interface can comprise any of a number of devices or interfaces allowing the mmWave RFID reader computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mmWave RFID reader computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mmWave RFID reader computing entity 102 can also include volatile memory 322 and/or non-volatile memory 324, which can be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the mmWave RFID reader computing entity 102. As indicated, this may include a user application that is resident on the mmWave RFID reader computing entity 102 or accessible through a browser or other user interface for communicating with the data analysis computing entity 106 and/or various other computing entities.

In another embodiment, the mmWave RFID reader computing entity 102 may include one or more components or functionalities that are the same or similar to those of the data analysis computing entity 106, as described in greater detail above. As will be recognized, these architectures and descriptions are provided for example purposes only and are not limiting to the various embodiments.

In various embodiments, the mmWave RFID reader computing entity 102 may be embodied as an artificial intelligence (AI) computing entity, such as an Amazon Echo, Amazon Echo Dot, Amazon Show, Google Home, and/or the like. Accordingly, the mmWave RFID reader computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Figure 4:
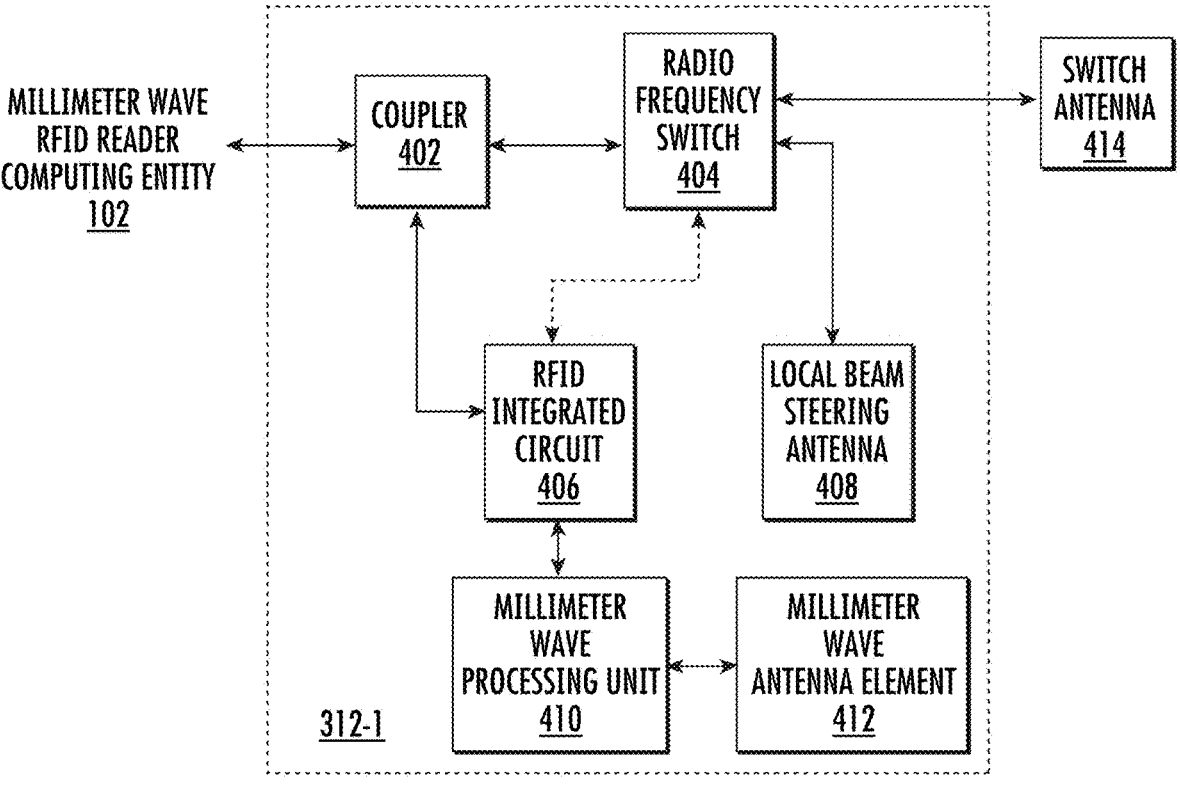
FIG. 4 provides an example antenna unit in accordance with some embodiments of the present disclosure.

FIG. 4 provides an illustrative schematic representative of an example one of the one or more antenna units 312 that can be used in conjunction with embodiments of the present disclosure for receiving RFID tag data and point cloud position data. Antenna unit 312-1 may be configured to communicate with mmWave RFID reader computing entity 102 via an air interface standard, such as electronic product code (EPC) generation 2 or any other RFID standard protocols. As depicted in FIG. 4, antenna unit 312-1 comprises a coupler 402, a radio frequency (RF) switch 404, and an RFID integrated circuit (IC) 406. Coupler 402 may comprise a directional coupler configured to (i) split signal output from mmWave RFID reader computing entity 102 to the RF switch 404 and the RFID IC 406 and (ii) combine discrete signals from RF switch 404 and RFID IC 406 to feed a single line to mmWave RFID reader computing entity 102. In some embodiments, the mmWave RFID reader computing entity 102 may be coupled to an input port of coupler 402, RF switch 404 may be coupled to a through port of coupler 402, and RFID IC 406 may be coupled to a coupled port of coupler 402.

RFID IC 406 may be configured to operate as an antenna controller. In some embodiments, RFID IC 406 may be configured to select an antenna for RFID scanning based on read instruction signals from mmWave RFID reader computing entity 102. For example, RFID IC 406 may receive instructions from mmWave RFID reader computing entity 102 to cycle between local beam steering antenna 408 and switch antenna 414. RF switch 404 may be switched by RFID IC 406 to enable routing of RF signals either through local beam steering antenna 408 or switch antenna 414.

In some embodiments, the mmWave RFID reader computing entity 102 may access antenna unit 312-1 to scan locations covered by local beam steering antenna 408 for RFID tags. In some embodiments, local beam steering antenna 408 may comprise an antenna at an immediate location coincident with antenna unit 312-1. For example, antenna unit 312-1 comprising local beam steering antenna 408 may be disposed overhead a location in an indoor environment. The location may comprise one or more beam zone regions covered by local beam steering antenna 408. An overhead position may be supported either vertically or horizontally mounted to the upper structure or the lower structure of a given environment. Additionally, antenna unit 312-1 could be suspended overhead supported by a fixture placed on the floor.

In some embodiments, the mmWave RFID reader computing entity 102 may access antenna unit 312-1 to relay RF signals between mmWave RFID reader computing entity 102 and switch antenna 414 for scanning locations covered by switch antenna 414 for RFID tags and point cloud position data. In some embodiments, switch antenna 414 may be at a location comprising one or more other beam zone regions remote from antenna unit 312-1. Switch antenna 414 may comprise or be coupled to components substantially similar to those comprised in antenna unit 312-1.

Antenna unit 312-1 further comprises an MPU 410 and a mmWave antenna element 412 coupled to the MPU 410. MPU 410 may scan, using the millimeter-wave band, a location coincident with the local beam steering antenna 408 via mmWave antenna element 412 for detecting objects (e.g., shoppers, merchandise, or shopping carts/baskets) and providing range, velocity, and angle of those objects in the form of point cloud position data. In some embodiments, the mmWave antenna element 412 comprises a four-element mmWave radar antenna. Generally, the millimeter wave may refer to an electromagnetic wave in the frequency domain of approximately 24-300 GHz. RFID IC 406 may be coupled to MPU 410 via an interface, such as serial peripheral interface (SPI), in a manner that allows mmWave RFID reader computing entity 102 to read data (e.g., point cloud position data) from MPU 410 through RFID IC 406.

Figure 5:
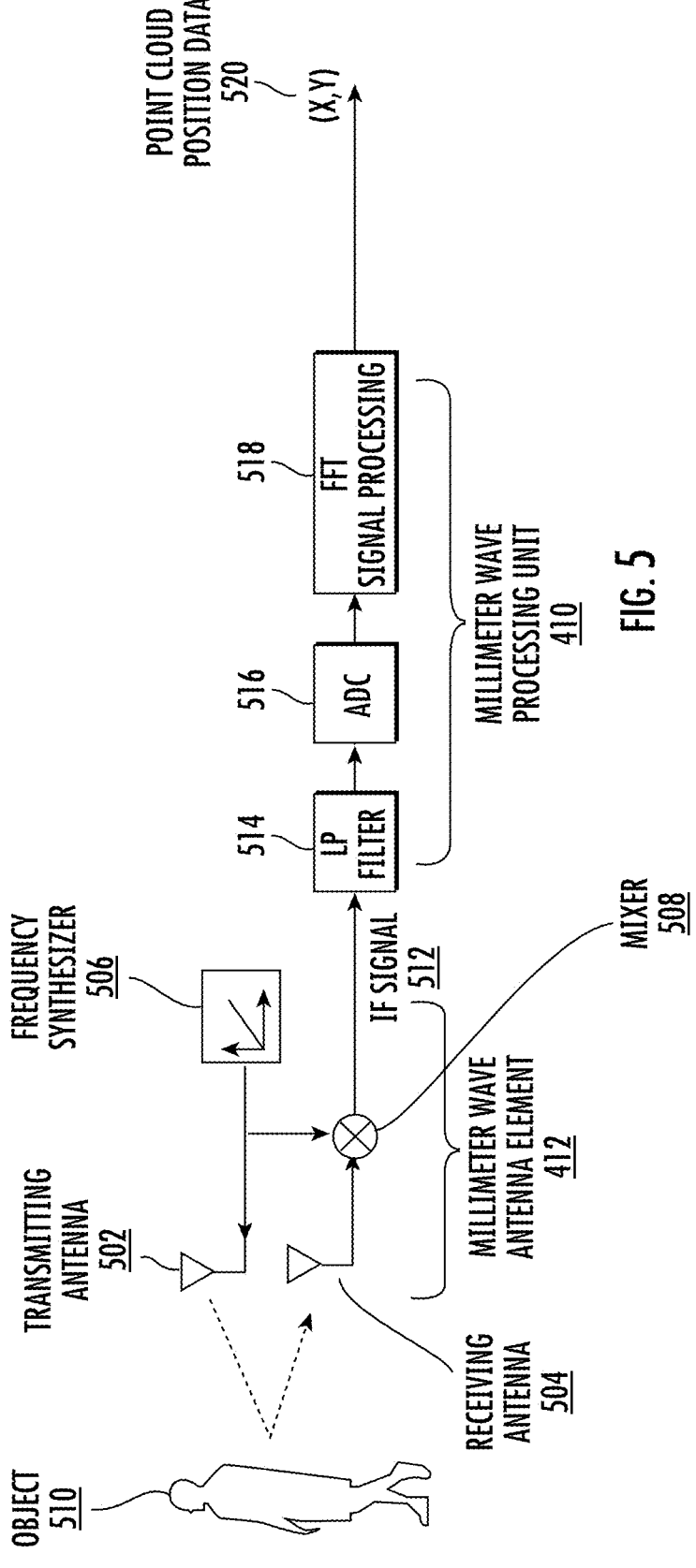
FIG. 5 provides an example millimeter wave components in accordance with some embodiments of the present disclosure.

FIG. 5 depicts example components of MPU 410 and mmWave antenna element 412. The mmWave antenna element 412 comprises a transmitting antenna 502, a receiving antenna 504, a frequency synthesizer 506, and a mixer 508. The Doppler principle may be used to determine motion, range, speed, and direction of object 510. In some embodiments, MPU 410 and a mmWave antenna element 412 may employ frequency-modulated continuous wave (FMCW). FMCW may comprise transmitting a frequency-modulated signal continuously in order to measure range as well as angle and velocity. Transmitting antenna 502 may be configured to emit a radar signal generated by the frequency synthesizer 506 with a frequency that increases continuously to create a signal sweep. Frequency synthesizer 506 may comprise an electronic circuit that uses an oscillator to generate a preprogrammed set of stable frequencies with minimal phase noise.

A radar signal transmitted from transmitting antenna 502 may be reflected by object 510, and as such, the signal's echo may be received by the receiving antenna 504. Mixer 508 may combine the radar signal generated by the frequency synthesizer 506 and transmitted from the transmitting antenna 502) with the echo signal received by the receiving antenna 504 to generate an intermediate frequency (IF) signal 512 comprising a difference between the transmitted signal and the echo signal (e.g., the Doppler shift). Echo signals received by the receiving antenna 504 may comprise a frequency difference, referred to as the Doppler frequency. That is, if object 510 is not stationary, the echo signal received by the receiving antenna 504 may comprise a change in frequency from that of the signal transmitted from the transmitting antenna 502. The Doppler frequency may be used to detect movement, velocity, and distance.

MPU 410 is coupled to the mmWave antenna element 412 and receives the IF signal 512 from mixer 508. MPU 410 comprises a low-pass (LP) filter 514, an analog-to-digital converter (ADC) 516, and a fast Fourier transform (FFT) signal processing module 518. The IF signal 512 may be passed through the LP filter 514 and the ADC 516 before being processed by the FFT signal processing module 518 to generate point cloud position data 520.

Figure 6:
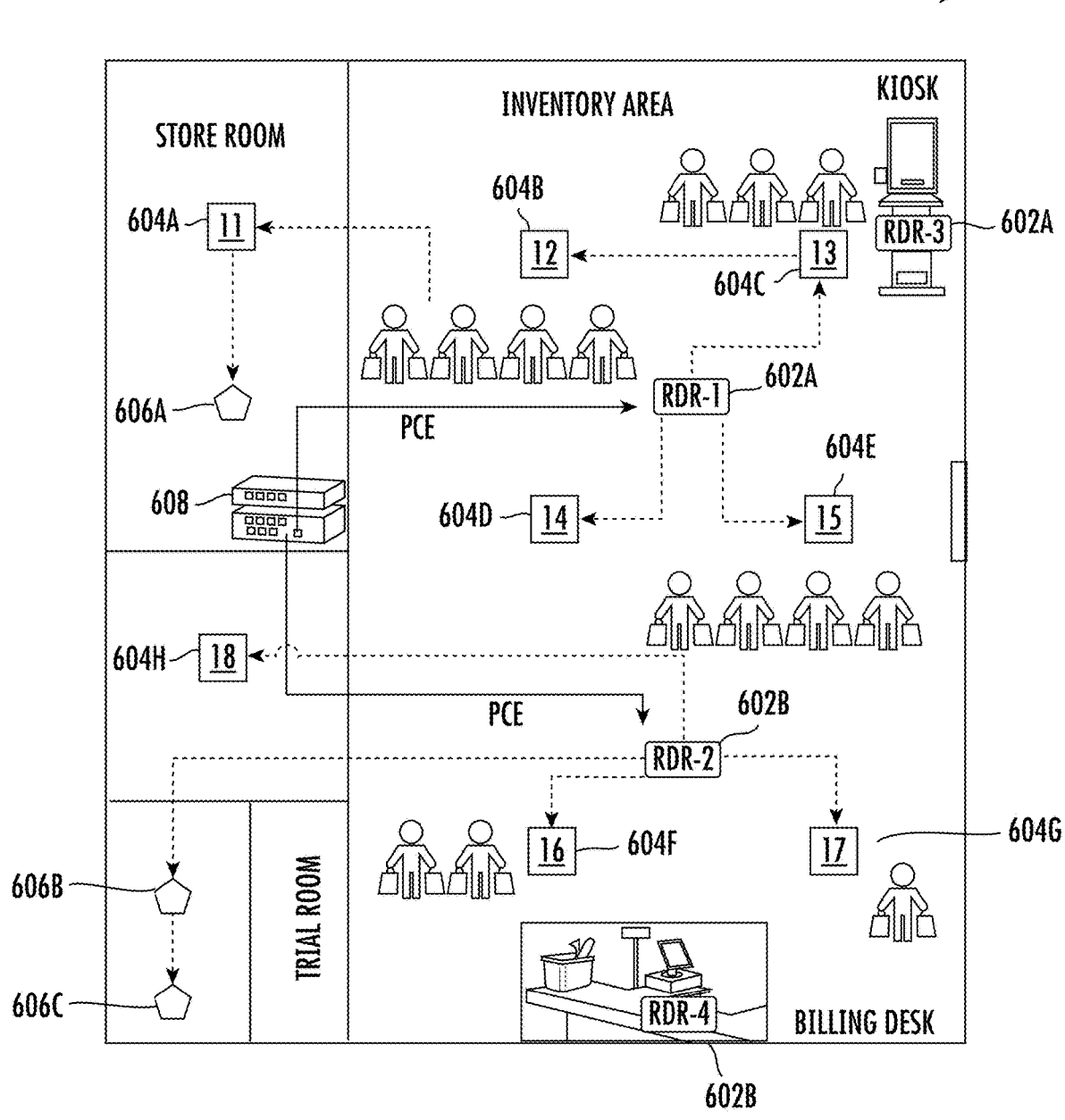
FIG. 6 provides an overhead view of at least a portion of an example shopper tracking system in accordance with some embodiments of the present disclosure.

FIG. 6 depicts an overhead view of at least a portion of an example shopper tracking system 600 deployed in a retail store according to one embodiment of the present disclosure. The shopper tracking system 600 depicted in FIG. 6 may be used to autonomously track movement of objects, such as shoppers, merchandise, or shopping carts/baskets, at a retail store that shoppers (e.g., actors within a local environment) visit to view, select and purchase products. A retail store may position numerous products throughout a sales floor that are to be sold and/or distributed to shoppers. The retail store may be any size or format, and may include products from one or more merchants. For example, the retail store may be a single store operated by one merchant, a chain of two or more stores operated by one entity, or may be one of a collection of stores covering multiple merchants.

The depicted shopper tracking system 600 comprises a plurality of mmWave RFID reader computing entities 602 (A,B), a plurality of antenna units 604(A-H), a plurality of switch antennas 606, a data analysis computing entity 608, and a plurality of RFID desktop readers 610(A,B). The mmWave RFID reader computing entities 602 may comprise overhead readers coupled to the plurality of antenna units 604 and switch antennas 606, which may be positioned at fixed locations throughout the retail store for detecting RFID signals from multiple RFID tags as well as position data of objects within the retail store. As such, objects (e.g., people, carts, or baskets) moving within the retail store may pass within scanning range of the plurality of antenna units 604 and switch antennas 606. The RFID desktop readers 610 may comprise readers for detecting RFID signals from RFID tags that within a shorter range than that of the plurality of antenna units 604 and switch antennas 606, and may be intended for an implicit transaction, such as price check, check-out, or purchase. RFID tags may be affixed to or incorporated into and/or affixed to items, or packaging of items being sold from the retail store (e.g., boxed food items, canned food items, cleaning supply items, produce items, frozen food items, consumer electronic goods, health products, beauty products, apparel, and other such items) that are positioned on shelves, modulars, racks, or endcaps, for example.

Data analysis computing entity 608 may be configured to monitor paths of travel of shoppers through a retail establishment, where each shopping cart and/or shopping basket of a retail establishment may be affixed with a RFID tag. For example, during operation, mmWave RFID reader computing entities 602 may scan via the plurality of antenna units 604 to identify from which beam zone a shopping cart RFID tag $X_1$ is being read and generate point cloud position data to identify a shopper $X_2$ in a first zone. Scanning of beam zones is described in further detail with respect to the description of FIG. 7.

The mmWave RFID reader computing entities 602 may transmit $X_1$ and $X_2$ to data analysis computing entity 608 to conjugate location of $X_2$ along with the shopping cart RFID tag $X_1$. Shopper $X_2$ may pick a merchandise $Y_1$ being read by antenna units 604, where merchandise $Y_1$ may be identified to being in proximity with the shopping cart RFID tag $X_1$, then data analysis computing entity 608 may assign merchandise $Y_1$ to the shopping cart RFID tag $X_1$. Since shopping cart RFID tag $X_1$ and shopper $X_2$ are conjugated, merchandise $Y_1$ is implicitly also assigned to shopper $X_2$. The mmWave RFID reader computing entities 602 may further detect activity associated with shopper $X_2$ moving to a second beam zone and selecting another merchandise $Y_2$. Such activity may be transmitted from mmWave RFID reader computing entities 602 to analysis computing entity 608 and interpreted to generate a shopper $X_2$ shopping behavior data set representative of shopper $X_2$, for example, selecting $Y_2$ after selecting $Y_1$. Shopping behavior data sets of different shoppers may be used stored to a database and used by retailers for planning sale offers and/or store planograms.

Figure 7:
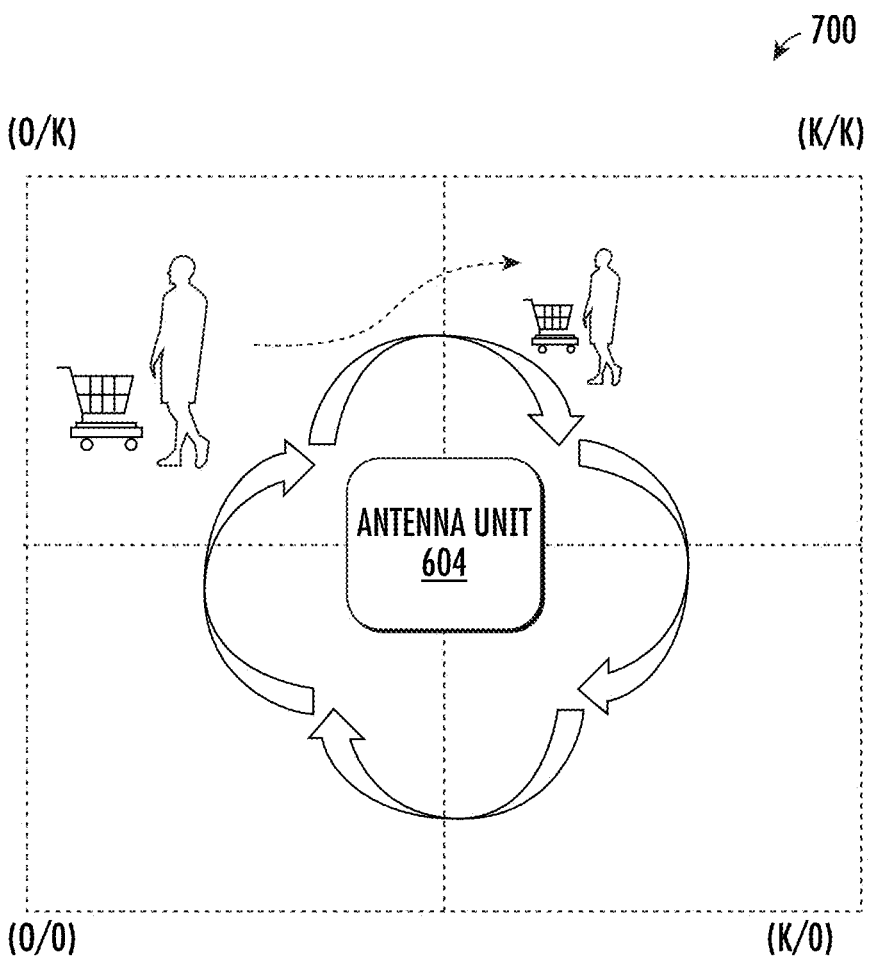
FIG. 7 provides an overhead view of quadrants representative of scanning range coverage of an antenna unit in accordance with some embodiments of the present disclosure.

FIG. 7 depicts an overhead view of quadrants 700 representative of scanning range coverage of a given one of the plurality of antenna units 604 according to various embodiments of the present disclosure. Each of the quadrants may be representative of individual beam zones. In some embodiments, a given one of the plurality of antenna units 604 may comprise a four-beam switched beam steering antenna above a floor area. An example scanning sequence of quadrants (0,0), (0, k), (k, k), and (k, 0) may be performed by antenna unit 604 to track RFID tags (e.g., attached to merchandise or shopping carts) interacted with by a shopper that is simultaneously tracked with a mmWave radar sensor (e.g., MPU 410), as depicted in FIG. 7.

The mmWave RFID reader computing entities 602 may be configured to identify from which beam zone a shopping cart RFID tag is being read and monitor for movement of a shopper corresponding to the shopping cart RFID tag via point cloud position data generated by mmWave radar detection (e.g., mmWave antenna element 412 and MPU 410). For example, point cloud position data associated with quadrants 700 may be used to corroborate with detection of RFID tag data in a particular beam zone. As such, mmWave RFID reader computing entities 602 may use point cloud position data to monitor paths of travel of shoppers through a retail establishment, where each shopping cart and/or shopping basket of a retail establishment is provided with a RFID tag.

Figure 8:
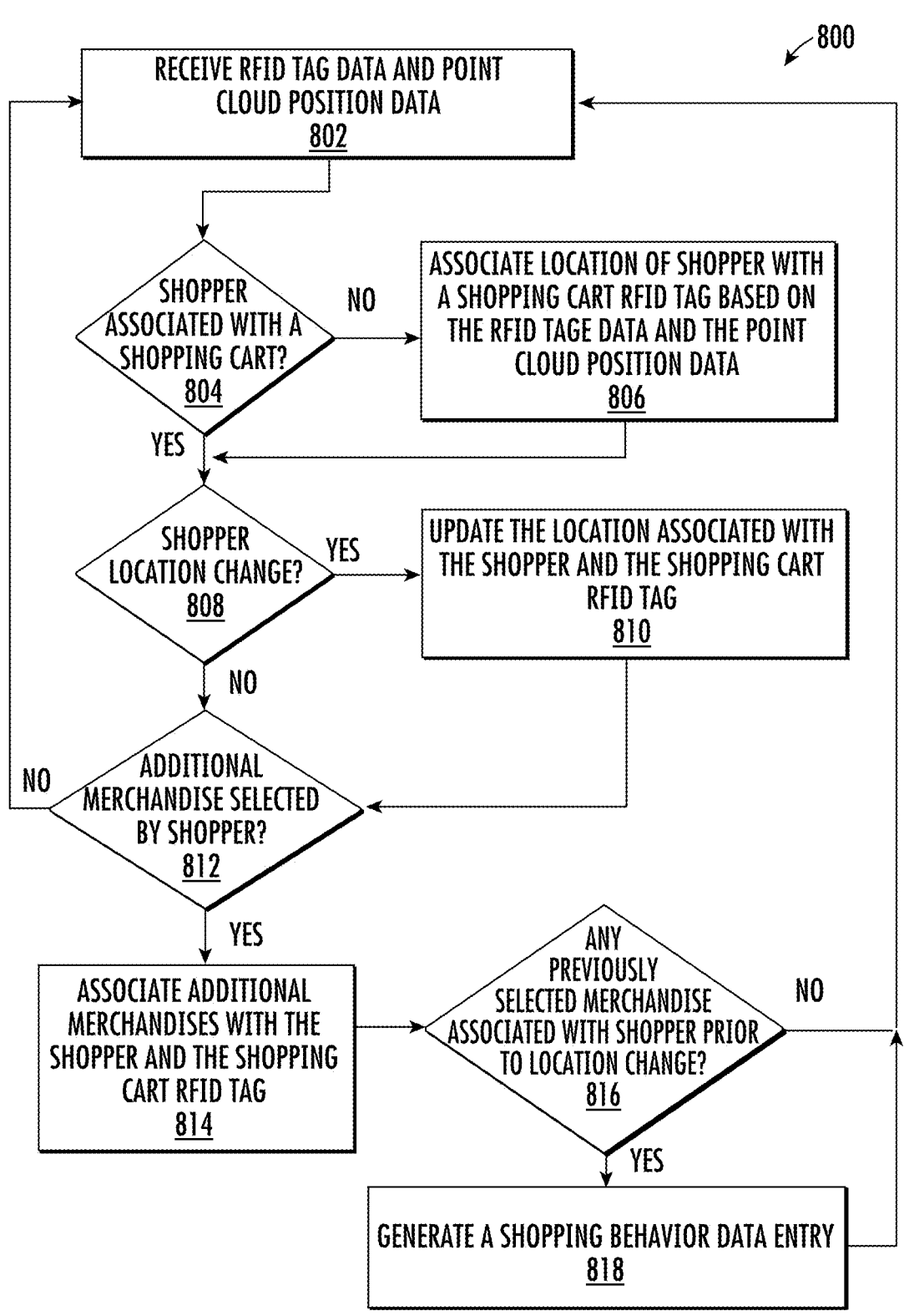
FIG. 8 provides a flowchart of a method for tracking objects in accordance with some embodiments discussed herein.

FIG. 8 depicts a flowchart of a method for tracking objects in accordance with some example embodiments of the present disclosure. It is noted that each block of a flowchart, and combinations of blocks in the flowchart, may be implemented by various means such as hardware, firmware, circuitry, and/or other devices associated with execution of software including one or more computer program instructions. For example, one or more of the steps/operations described in FIG. 8 may be embodied by computer program instructions, which may be stored by a non-transitory memory of an apparatus employing an embodiment of the present disclosure and executed by a processor component in an apparatus (such as, but not limited to, data analysis computing entity 106). For example, these computer program instructions may direct the processor component to function in a particular manner, such that the instructions stored in the computer-readable storage memory produce an article of manufacture, the execution of which implements the function specified in the flowchart block(s).

In FIG. 8 the example method 800 may be executed by data analysis computing entity 106. At step 802, the data analysis computing entity 106 receives RFID tag data and point cloud position data from, for example, mmWave RFID reader computing entities 102. RFID tag data may comprise identification of one or more RFID tags detected in one of one or more beam zones. Point cloud position data may comprise identification of objects, such as shoppers, shopping carts, and merchandises, within coordinates associated with the one or more beam zones. The RFID tag data may be generated by mmWave RFID reader computing entities 102 based on RF signals received from one or more RFID tags in response to RFID read signals transmitted from the mmWave RFID reader computing entities 102. Point cloud position data may be generated by an MPU coupled to a mmWave antenna element and transmitted to the mmWave RFID reader computing entities 102. Together, the RFID tag data and point cloud position data may be used by data analysis computing entity 106 in a complementary manner.

In some embodiments, subsequent to step 802, the example method proceeds to step 804, where the data analysis computing entity 106 determines whether a given one of a plurality of shoppers is associated with a shopping cart. The shopper may be detected based on the point cloud position data and the shopping cart may be identified by its RFID tag based on the RFID tag data. In some embodiments, determining whether the shopper is associated with a shopping cart may comprise determining a location of the shopping cart based on the RFID tag data and corroborating shopper interaction with the shopping cart based on point cloud position data. Determining whether the shopper is associated with a shopping cart may also comprise detecting that the shopper is within a vicinity of an unassociated shopping cart. Determining whether the shopper is associated with a shopping cart may further comprise determining whether the shopper has already been previously associated with a shopping cart.

In some embodiments, subsequent to step 804, if the shopper is not associated with a shopping cart, the example method proceeds to step 806, where the data analysis computing entity 106 associates a location of the given shopper with a shopping cart RFID tag based on the RFID tag data and the point cloud position data. The location may comprise an identification of a beam zone and/or point cloud coordinates. The shopper may be associated to a shopping cart based a detection of an unassociated shopping cart that is in close proximity to a location of a shopper. In some embodiments, the association may be confirmed based on an observation of RFID tag data and point cloud position data over time, which is described in further detail with respect to the description of step 810.

In some embodiments, subsequent to step 806, the example method proceeds to step 808. In some embodiments, subsequent to step 804, if the shopper is associated with a shopping cart, the example method also proceeds to step 808. At step 808, the data analysis computing entity 106 determines whether a location change of the shopper has occurred. Determining whether a location change of the shopper has occurred may comprise determining that a current location of the shopper is different from the location associated with the shopper and the shopping cart RFID tag. For example, the current location of the shopper may comprise a beam zone and/or point cloud coordinates that are different from a beam zone and/or point cloud coordinates of a previous location associated with the shopper and the shopping cart RFID tag (e.g., performed in step 806). In some embodiments, determining whether a location change of the shopper has occurred may also comprise determining whether a current location of the shopping cart RFID tag associated with the shopper has changed with respect to the location associated with the shopper and/or the shopping cart RFID tag, or a current location of the shopper. For example, the data analysis computing entity 106 may monitor whether a shopping cart RFID tag is moving in a corresponding manner with respect to a shopper within one or more beam zones. As such, an association of a shopper to a shopping cart may be changed or updated based on the monitoring (e.g., whether the shopper remains associated with the unassociated shopping cart).

In some embodiments, subsequent to step 808, if a location change of the shopper has occurred, the example method proceeds to step 810, where the data analysis computing entity 106 updates the location associated with the shopper and the shopping cart RFID tag. For example, the data analysis computing entity 106 may associate a new location with the shopper and the shopping cart RFID tag. In some embodiments, updating the location associated with the shopper and the shopping cart RFID tag may comprise associating the shopper and the shopping cart RFID tag with a new location of the shopper.

In some embodiments, updating the location associated with the shopper and the shopping cart RFID tag may comprise associating the shopper to a new shopper location and associating the shopping cart RFID tag with a new shopping cart location. In some embodiments, a counter or timer means may be employed to determine a degree of dissociation between a shopper and a shopping cart RFID tag associated with the shopper. In some embodiments, updating the location associated with the shopper and the shopping cart RFID tag further comprises updating an association of a shopper with a shopping cart RFID tag. For example, the data analysis computing entity 106 may determine that a shopper should not be associated with a shopping cart RFID tag based on the counter or timer.

In some embodiments, subsequent to step 810, the example method proceeds to step 812. In some embodiments, subsequent to step 808, if the location associated with the shopper has not changed, the example method also proceeds to step 812. At step 812, the data analysis computing entity 106 determines whether one or more additional merchandises have been selected by the shopper. Determining whether one or more additional merchandises have been selected by the shopper may comprise detecting RFID tags associated with the one or more additional merchandises and determining whether the one or more additional merchandises associated with the RFID tags are in proximity to the location of the shopper. Determining proximity of the one or more additional merchandises to the location of the shopper may comprise determining one or more of angle, received signal strength indicator (RSSI), or movement/visibility of RFID tags associated with the one or more additional merchandises in a particular zone based on the RFID tag data and the point cloud position data.

In some embodiments, subsequent to step 812, if one or more additional merchandises have been selected by the shopper, the example method proceeds to step 814, where the data analysis computing entity 106 associates the one or more additional merchandises with the shopper and the shopping cart RFID tag. Otherwise, if additional merchandises have not been selected by the shopper, the example method proceeds to step 802, where the data analysis computing entity 106 receives additional RFID tag data and point cloud position data.

In some embodiments, subsequent to step 814, the example method proceeds to step 816, where the data analysis computing entity 106 determines whether any previously selected merchandise was associated with the shopper prior to the change in the location associated with the shopper.

In some embodiments, subsequent to step 816, if any previously selected merchandise was associated with the shopper prior to the change in the location associated with the shopper, the example method proceeds to step 818, where the data analysis computing entity 106 generates a shopping behavior data entry. In some embodiments the shopping behavior data entry may comprise an indication of the shopper selecting the one or more additional merchandises after selection of previously selected merchandises and the change in shopper location. In some embodiments, subsequent to step 816, if no previously selected merchandise was associated with the shopper prior to the change in the location associated with the shopper, the example method proceeds to step 802, where the data analysis computing entity 106 receives additional RFID tag data and point cloud position data.

Although example method 800 was described with respect to a single shopper, the example steps of method 800 may be performed for each of a plurality of shoppers. Furthermore, the disclosed systems and methods are described in the context of retail and commerce, however, embodiments of the present disclosure may be applied to other domains, such as healthcare, defense, industrial, or agriculture environments.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An antenna unit comprising:
a coupler coupled to a reader computing entity at an input port of the coupler;
a radio frequency (RF) switch coupled to a first output port of the coupler;
a radio frequency identification (RFID) integrated circuit (IC) coupled to a second output port of the coupler, the RFID IC configured to select between a local beam steering antenna and a switch antenna for RFID scanning by switching RF switch based on read instruction signals from the reader computing entity;
a mmWave antenna element configured to generate radar signals; and
a mmWave processing unit (MPU) coupled to the RFID IC, and the mmWave antenna element, wherein the MPU is configured to detect one or more objects in the form of point cloud position data based on the radar signals, wherein:
(i) the point cloud position data is deterministic of at least a location that corresponds to the one or more objects,
(ii) the point cloud position data is transmitted to the RFID IC, and
(iii) the RFID IC is configured to cause activation of the local beam steering antenna based on the location that corresponds to the one or more objects.

2. The antenna unit of claim 1, wherein the mmWave antenna element comprises a four-element mmWave radar antenna.

3. The antenna unit of claim 1, wherein the MPU is coupled to the RFID IC using a serial peripheral interface.

4. The antenna unit of claim 1, wherein the local beam steering antenna is disposed overhead an indoor environment.

5. The antenna unit of claim 1, wherein the mmWave antenna element comprises a transmitting antenna, a receiving antenna, a frequency synthesizer, and a mixer.

6. A method for tracking objects comprising:
receiving, by a computing device, first RFID tag data and point cloud position data from one or more reader computing entities, wherein the point cloud position data is deterministic of a location of a shopper in an indoor environment;
causing, by the computing device, activation of a local beam steering antenna to scan for one or more RFID tags at the location of the shopper based on the location of the shopper;
receiving, by the computing device, second RFID tag data of a shopping cart RFID tag associated with a shopping cart in vicinity of the shopper;
associating, by the computing device, the location of the shopper with the shopping cart RFID tag based on the first RFID tag data and the point cloud position data;

determining, by the computing device, whether a location change of the shopper has occurred based on the point cloud position data, wherein the local beam steering antenna is activated to scan for the one or more RFID tags at an updated location of the shopper in response to a determination of the location change of the shopper;
determining, by the computing device, one or more additional merchandises have been selected by the shopper based on a detection of the one or more RFID tags at the updated location;
associating, by the computing device, the one or more additional merchandises with the shopper and the shopping cart RFID tag;
determining, by the computing device, one or more previously selected merchandises associated with the shopper prior to the location change; and
generating a shopping behavior data entry for the shopper comprising an indication of the shopper selecting the one or more additional merchandises after selection of the one or more previously selected merchandises and the location change.

7. The method of claim 6, wherein the point cloud position data is deterministic of an object location.

8. The method of claim 6, wherein the first RFID tag data is generated based on RF signals received from the one or more RFID tags in response to RFID read signals transmitted from the one or more reader computing entities.

9. The method of claim 6, wherein the point cloud position data is generated by a millimeter wave processing unit (MPU).

10. The method of claim 6, wherein the location of the shopper is deterministic of a beam zone, wherein the local beam steering antenna is configured to scan for the one or more RFID tags.

11. The method of claim 6, wherein determining the location change of the shopper has occurred further comprises determining that a current location of the shopper is different from the location of the shopper and the shopping cart RFID tag.

12. The method of claim 11, wherein the current location of the shopper comprises a second beam zone and/or second set of one or more point cloud coordinates that are different from a first beam zone and/or first set of one or more point cloud coordinates of the location of the shopper and the shopping cart RFID tag.

13. The method of claim 6 further comprising updating the location of the shopper based on the location change.

14. The method of claim 6, wherein determining the one or more additional merchandises have been selected by the shopper further comprises:
detecting RFID tags associated with the one or more additional merchandises; and
determining the one or more additional merchandises are in proximity to the location of the shopper.

15. The method of claim 14, wherein determining the one or more additional merchandises are in proximity to the location of the shopper further comprises determining one or more of angle, received signal strength indicator, or movement/visibility of the one or more RFID tags associated with the one or more additional merchandises based on the first RFID tag data and the point cloud position data.

* * * * *